United States Patent
Pierce et al.

(10) Patent No.: US 7,874,797 B2
(45) Date of Patent: *Jan. 25, 2011

(54) METHODS AND APPARATUS FOR BALANCING A ROTOR

(75) Inventors: Kirk Gee Pierce, Simpsonville, SC (US); Robert Peter Slack, Greenville, SC (US)

(73) Assignee: General Electric Company, Schenectady, NY (US)

( * ) Notice: Subject to any disclaimer, the term of this patent is extended or adjusted under 35 U.S.C. 154(b) by 160 days.

This patent is subject to a terminal disclaimer.

(21) Appl. No.: 12/249,468

(22) Filed: Oct. 10, 2008

(65) Prior Publication Data

US 2009/0035136 A1    Feb. 5, 2009

Related U.S. Application Data

(63) Continuation of application No. 11/424,907, filed on Jun. 19, 2006, now Pat. No. 7,437,264.

(51) Int. Cl.
*F03D 11/00* (2006.01)

(52) U.S. Cl. ................... 416/1; 416/61; 416/43

(58) Field of Classification Search ........... 416/1, 416/61, 43; 702/151, 154
See application file for complete search history.

(56) References Cited

U.S. PATENT DOCUMENTS

| | | | | |
|---|---|---|---|---|
| 4,161,658 A | | 7/1979 | Patrick | |
| 4,291,235 A | * | 9/1981 | Bergey et al. | 290/55 |
| 4,297,076 A | * | 10/1981 | Donham et al. | 416/37 |
| 4,435,647 A | | 3/1984 | Harner et al. | |
| 4,589,782 A | | 5/1986 | Park | |
| 4,596,470 A | | 6/1986 | Park | |
| 6,361,275 B1 | * | 3/2002 | Wobben | 416/33 |
| 6,619,918 B1 | | 9/2003 | Rebsdorf | |
| 6,850,821 B2 | | 2/2005 | Weitkamp | |
| 7,004,724 B2 | | 2/2006 | Pierce et al. | |
| 7,118,339 B2 | | 10/2006 | Moroz et al. | |

(Continued)

FOREIGN PATENT DOCUMENTS

EP        0995904 A2    4/2000

(Continued)

OTHER PUBLICATIONS

Friedrich Wilhelm and George Kolrausch, "An Introduction to Physical Measurements: With Appendices on Absolute Electrical Measurement, Etc.", D. Appleton & Co. 1899, pp. 137-138.

(Continued)

*Primary Examiner*—Ninh H Nguyen
(74) *Attorney, Agent, or Firm*—Armstrong Teasdale LLP (57) ABSTRACT

A method for balancing a rotor of a rotary machine, wherein the rotor includes at least two rotor blades and a rotor shaft, includes receiving at least one measurement of either a load, an acceleration, or a displacement that pertains to at least one bending moment acting on the rotor shaft, determining at least one value of the at least one bending moment acting on the rotor shaft based, at least in part, on the received at least one measurement, and determining a pitch offset angle value of at least one rotor blade that facilitates reducing the at least one bending moment acting on the rotor shaft.

20 Claims, 4 Drawing Sheets

U.S. PATENT DOCUMENTS

| | | | |
|---|---|---|---|
| 7,160,083 | B2 | 1/2007 | Pierce et al. |
| 7,351,033 | B2* | 4/2008 | McNerney ..................... 416/1 |
| 7,437,264 | B2* | 10/2008 | Pierce et al. ................ 702/151 |
| 2004/0042897 | A1 | 3/2004 | Pietricola |
| 2004/0151577 | A1* | 8/2004 | Pierce et al. ................. 415/4.1 |

FOREIGN PATENT DOCUMENTS

| | | |
|---|---|---|
| GB | 2117934 A | 3/1983 |
| WO | 2004074681 A1 | 9/2004 |
| WO | 2005010358 A1 | 2/2005 |
| WO | 2007104306 A1 | 9/2007 |

OTHER PUBLICATIONS

E.A. Avallone and T. Baumeister, III, Editors, "Marks' Standard Handbook for Mechanical Engineers", 10th Edition, McGraw-Hill, 1996, pp. 3-3 through 5-37.

E.A. Bossanyi, "Individual Blade Pitch Control for Load Reduction", Oct. 8, 2002, pp. 119-128, vol. 6, XP008031928 ISSN: 1099-1824.

Written Opinion of the International Searching Authority for PCT/US2004/022489, 6 pages.

Written Opinion of the International Searching Authority for PCT/DK2006/000153, 5 pages.

P. Caselitz et al., "Reductiion of Fatigue Loads on Wind Energy Converters By Advanced Control Methods," European Wind Energy Conference, Oct. 1997, pp. 555-558, Dublin Castle, Ireland.

Office Action mailed Nov. 27, 2006, U.S. Appl. No. 11/424,907.

Office Action mailed Aug. 6, 2007, U.S. Appl. No. 11/424,907.

Final Office Action mailed Mar. 26, 2007, U.S. Appl. No. 11/424,907.

Final Office Action mailed Jan. 15, 2008, U.S. Appl. No. 11/424,907.

Office Action Examiners Interview Summary mailed Apr. 27, 2007, U.S. Appl. No. 11/424,907.

Notice of Allowability dated Jun. 1, 2008, U.S. Appl. No. 11/424,907.

Notice of Allowance and Fee(s) Due mailed Jun. 10, 2008, U.S. Appl. No. 11/424,907.

* cited by examiner

METHODS AND APPARATUS FOR BALANCING A ROTOR

CROSS-REFERENCE TO RELATED APPLICATIONS

This application is a continuation of U.S. patent application Ser. No. 11/424,907, filed Jun. 19, 2006 now U.S. Pat. No. 7,437,264, which is hereby incorporated by reference and is assigned to the assignee of the present invention.

BACKGROUND OF THE INVENTION

This invention relates generally to rotors, and more specifically to methods and apparatus for balancing a rotor.

Utility grade wind turbines (i.e., wind turbines designed to provide electrical power to a utility grid) can sometimes have rotors of 30 or more meters in diameter. Imbalanced loading in the rotating frame acting on at least some known rotors may occur due to mass imbalance in the blade set, geometrical irregularities in rotor and/or blade mounting, differences in aerodynamic geometry (section, bend, and/or twist) between the blades, and/or differences in pitch angle zero point between the blades. Such imbalanced loads acting on the rotor may be induced to other components of the wind turbine, which may have an impact upon a number of fatigue cycles some components of the wind turbine experience. For example, imbalanced loads acting on the rotor may facilitate fatigue damage of a bedplate that connects a tower of the wind turbine to the ground, may facilitate damage to and/or failure of portions of a nacelle of the wind turbine, and/or may facilitate damage to and/or failure of other components of the wind turbine, such as, but not limited to, main shaft bearings, a yaw system of the wind turbine, and/or the wind turbine tower.

BRIEF DESCRIPTION OF THE INVENTION

In one aspect, a method is provided for balancing a rotor of a rotary machine, wherein the rotor includes at least two rotor blades and a rotor shaft. The method includes receiving at least one measurement of either a load, an acceleration, or a displacement that pertains to at least one bending moment acting on the rotor shaft, determining at least one value of the at least one bending moment acting on the rotor shaft based, at least in part, on the received at least one measurement, and determining a pitch offset angle value of at least one rotor blade that facilitates reducing the at least one bending moment acting on the rotor shaft.

In another aspect, a rotary machine includes a rotor having a hub, at least two rotor blades coupled to the hub, and a rotor shaft coupled to the hub for rotation therewith. The rotary machine also includes at least one blade pitch actuator coupled to the at least two rotor blades for controlling an angle of pitch of the at least two rotor blades, at least one sensor configured to measure at least one of a load, an acceleration, and a displacement that pertains to at least one bending moment acting on the rotor shaft, and a processor coupled to the at least one blade pitch actuator and coupled to the at least one sensor. The processor is configured to balance the rotor by receiving, from the at least one sensor, at least one measurement of either a load, an acceleration, or a displacement that pertains to at least one bending moment acting on the rotor shaft, determining at least one value of the at least one bending moment acting on the rotor shaft based, at least in part, on the received at least one measurement, and determining a pitch offset angle value for at least one rotor blade that facilitates reducing the at least one bending moment acting on the rotor shaft.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. As used herein, the term "windmill" is intended to be representative of any wind turbine that uses rotational energy generated from wind energy, and more specifically mechanical energy converted from kinetic energy of wind, for a predetermined purpose other than generating electrical power, such as, but not limited to, pumping a fluid and/or grinding a substance.

Figure 1:
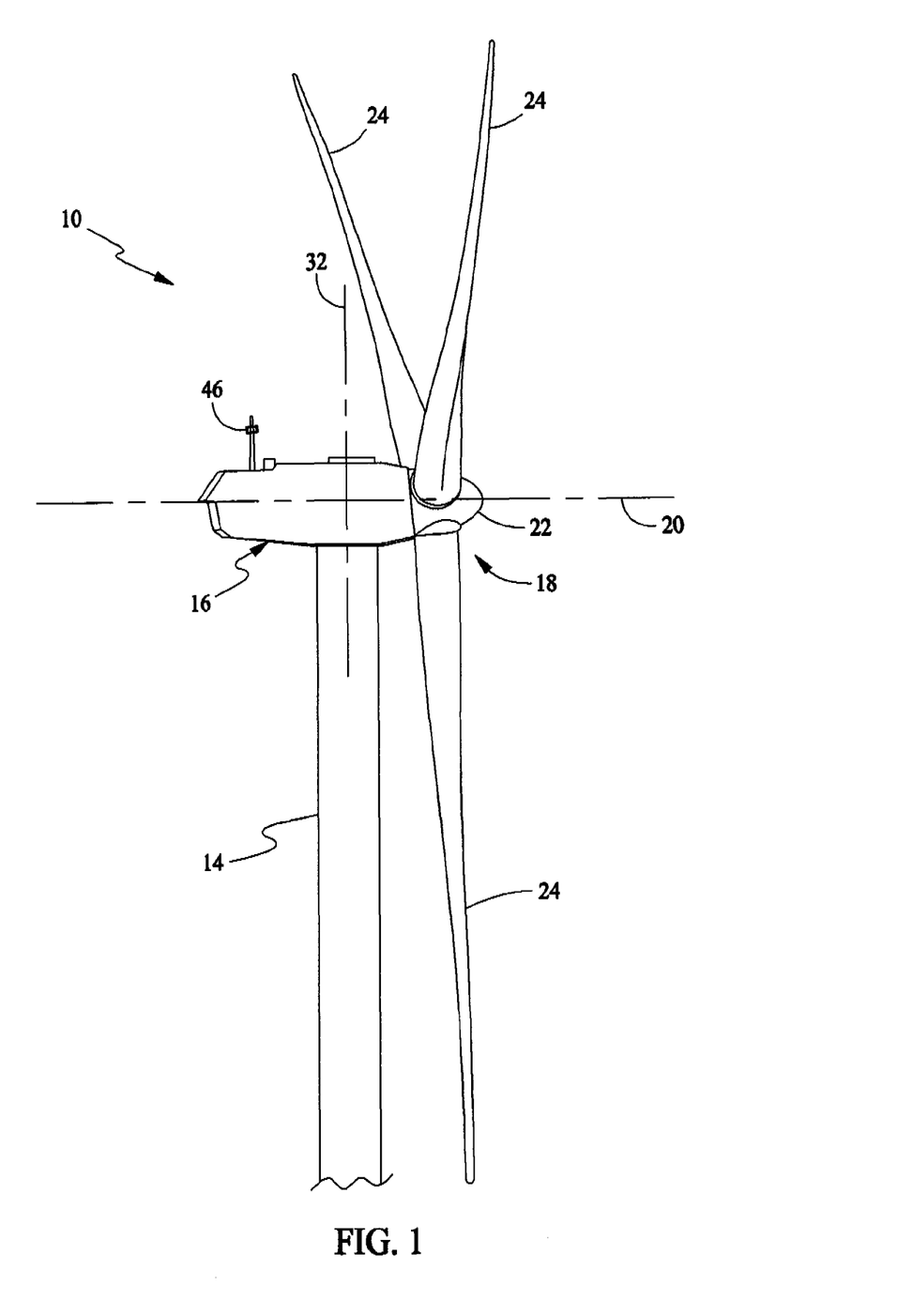
FIG. 1 is a perspective of an exemplary wind turbine.

FIG. 1 is a perspective of an exemplary embodiment of an exemplary wind turbine 10. Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown), for receiving electrical power therefrom to drive operation of wind turbine 10 and/or its associated components and/or for supplying electrical power generated by wind turbine 10 thereto. Although only one wind turbine 10 is shown in FIG. 1-3, in some embodiments a plurality of wind turbines 10 may be grouped together, sometimes referred to as a "wind farm" and/or a "wind park".

Wind turbine 10 includes a body 16, sometimes referred to as a "nacelle", and a rotor (generally designated by 18) coupled to body 16 for rotation with respect to body 16 about an axis of rotation 20. In the exemplary embodiment, nacelle 16 is mounted on a tower 14. However, in some embodiments, in addition or alternative to tower-mounted nacelle 16, wind turbine 10 includes a nacelle 16 adjacent the ground and/or a surface of water. The height of tower 14 may be any suitable height enabling wind turbine 10 to function as described herein. Rotor 18 includes a hub 22 and a plurality of blades 24 (sometimes referred to as "airfoils") extending radially outwardly from hub 22 for converting wind energy into rotational energy. Although rotor 18 is described and illustrated herein as having three blades 24, rotor 18 may have any number of blades 24. Blades 24 may each have any length (whether described and/or illustrated herein). For example, in some embodiments one or more rotor blades 24 are about 0.5 meters long, while in some embodiments one or more rotor blades 24 are about 50 meters long. Other examples of blade 24 lengths include 10 meters or less, about 20 meters, about 37 meters, and about 40 meters. Still other examples include rotor blades between about 50 and about 100 meters long.

Despite how rotor blades 24 are illustrated in FIG. 1, rotor 18 may have blades 24 of any shape, and may have blades 24 of any type and/or any configuration, whether such shape, type, and/or configuration is described and/or illustrated herein. One example of another type, shape, and/or configuration of rotor blades 24 is a ducted rotor (not shown) having a turbine (not shown) contained within a duct (not shown). Another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Figure 2:
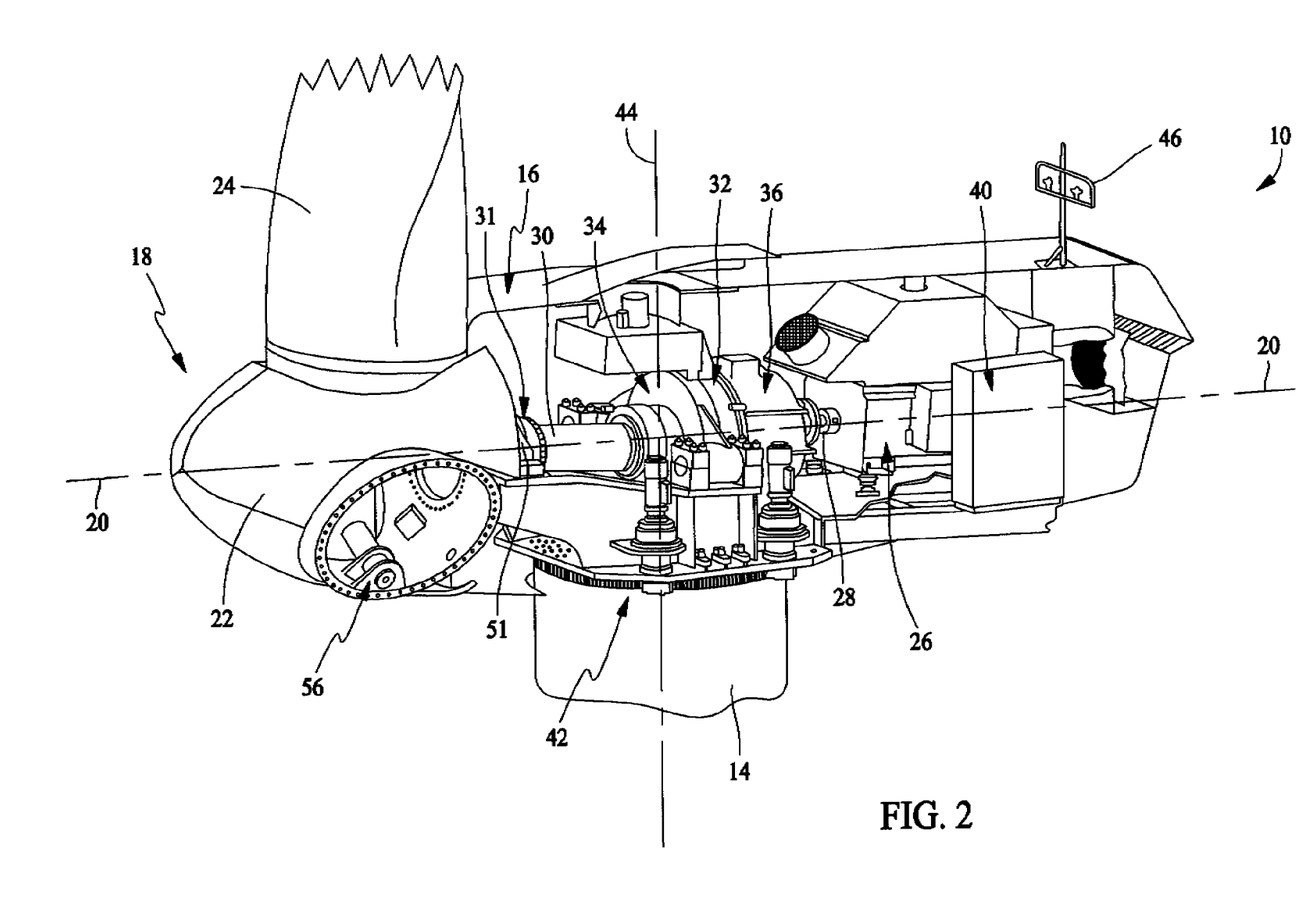
FIG. 2 is a partially cut-away perspective view of a portion of the wind turbine shown in FIG. 1.
Figure 3:
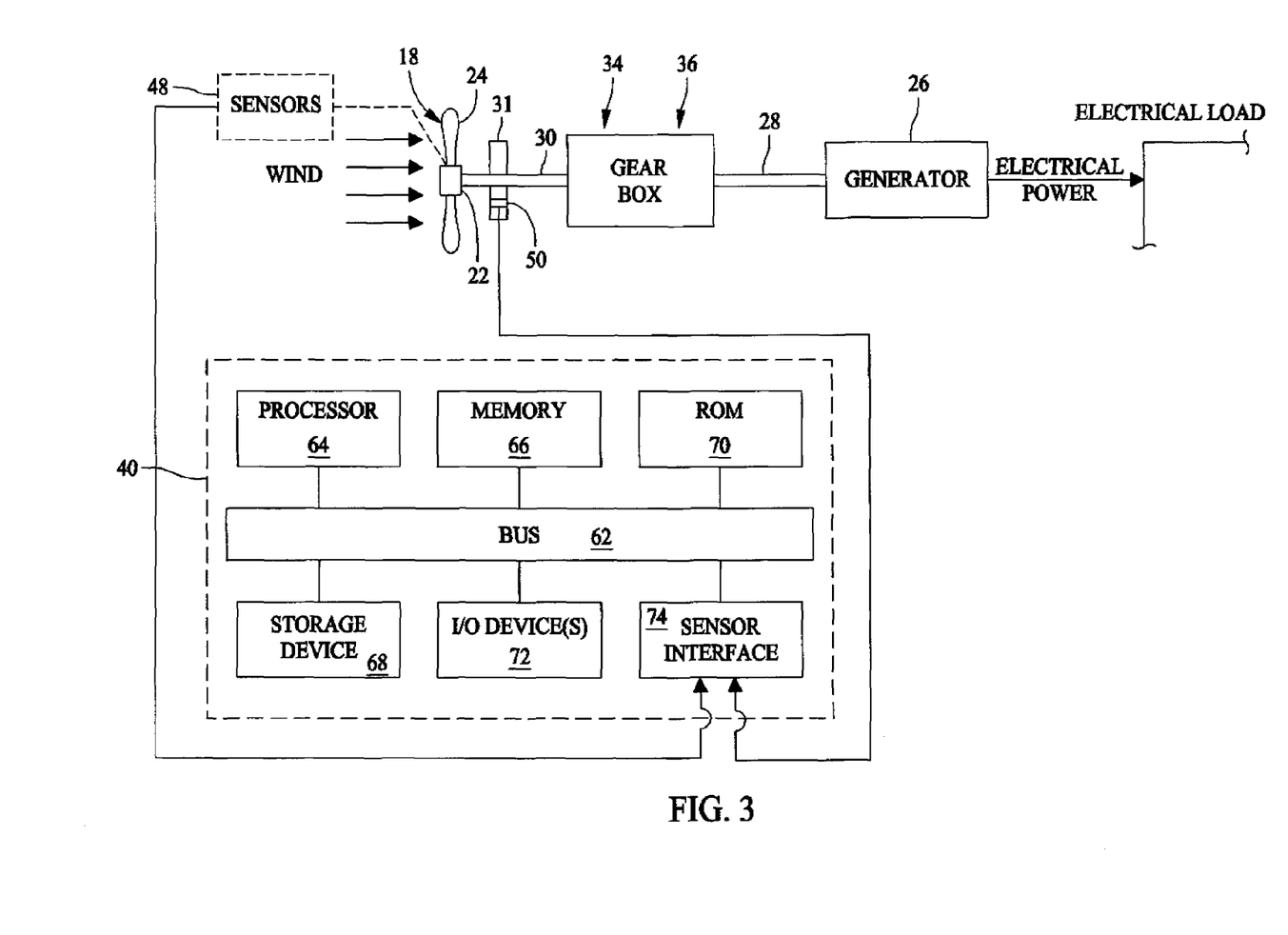
FIG. 3 is a schematic diagram of the wind turbine shown in FIGS. 1 and 2.

Referring now to FIGS. 2 and 3, in the exemplary embodiment, wind turbine 10 includes an electrical generator 26 coupled to rotor 18 for generating electrical power from the rotational energy generated by rotor 18, Generator 26 may be any suitable type of electrical generator, such as, but not limited to, a wound rotor induction generator. Generator 26 includes a stator (not shown) and a rotor (not shown). Rotor 18 includes a rotor shaft 30 coupled to rotor hub 22 for rotation therewith. A main bearing 31 is coupled to rotor shaft 30 to facilitate supporting rotor shaft 30 and to facilitate rotation of rotor shaft 30. Generator 26 is coupled to rotor shaft 30 such that rotation of rotor shaft 30 drives rotation of the generator rotor, and therefore operation of generator 26. In the exemplary embodiment, the generator rotor has a rotor shaft 28 coupled thereto and coupled to rotor shaft 30 such that rotation of rotor shaft 30 drives rotation of the generator rotor. In other embodiments, the generator rotor is directly coupled to rotor shaft 30, sometimes referred to as a "direct-drive wind turbine". In the exemplary embodiment, generator rotor shaft 28 is coupled to rotor shaft 30 through a gearbox 32, although in other embodiments generator rotor shaft 28 is coupled directly to rotor shaft 30. More specifically, in the exemplary embodiment gearbox 32 has a low speed side 34 coupled to rotor shaft 30 and a high speed side 36 coupled to generator rotor shaft 28. The torque of rotor 18 drives the generator rotor to thereby generate electrical power from rotation of rotor 18 for delivery to an electrical load (not shown), such as, but not limited to a power grid (not shown), coupled to generator 26. General operation of the electrical generator to generate electrical power from the rotational energy of rotor 18 is known in the art and therefore will not be described in more detail herein.

In some embodiments, wind turbine 10 may include one or more control systems 40 coupled to some or all of the components of wind turbine 10 for generally controlling operation of wind turbine 10 and/or as some or all of the components thereof (whether such components are described and/or illustrated herein). In the exemplary embodiment, control system(s) 40 is mounted within nacelle 16. However, additionally or alternatively, one or more control systems 40 may be remote from nacelle 16 and/or other components of wind turbine 10. Control system(s) 40 may be used for, but is not limited to, overall system monitoring and control including, for example, pitch and speed regulation, high-speed shaft and yaw brake application, yaw and pump motor application, and/or fault monitoring. Alternative distributed or centralized control architectures may be used in some embodiments.

In some embodiments, wind turbine 10 may include a disc brake (not shown) for braking rotation of rotor 18 to, for example, slow rotation of rotor 18, brake rotor 18 against full wind torque, and/or reduce the generation of electrical power from electrical generator 26. Furthermore, in some embodiments, wind turbine 10 may include a yaw system 42 for rotating nacelle 16 about an axis of rotation 44 for changing a yaw of rotor 18, and more specifically for changing a direction faced by rotor 18 to, for example, adjust an angle between the direction faced by rotor 18 and a direction of wind. Yaw system 42 may be coupled to control system(s) 40 for control thereby. In some embodiments, wind turbine 10 may include anemometry 46 for measuring wind speed and/or wind direction. Anemometry 46, in some embodiments, may be coupled to control system(s) 40 for sending measurements to control system(s) 40 for processing thereof. For example, and although anemometry 46 may be coupled to control system(s) 40 for sending measurements thereto for controlling other operations of wind turbine 10, anemometry 46 may send measurements to control system(s) 40 for controlling and/or changing a yaw of rotor 18 using yaw system 42. Alternatively, anemometry 46 may be coupled directly to yaw system 42 for controlling and/or changing a yaw of rotor 18.

In the exemplary embodiment, wind turbine 10 includes a plurality of sensors 48, each coupled to a corresponding blade 24 for measuring a pitch of each blade 24, or more specifically an angle of each blade 24 with respect to a wind direction and/or with respect to rotor hub 22. Sensors 48 may be any suitable sensor having any suitable location within or remote to wind turbine 10, such as, but not limited to, optical encoders within pitch system 56 (described below). In some embodiments, sensors 48 are coupled to control system(s) 40 for sending pitch measurements to control system(s) 40 for processing thereof.

In the exemplary embodiment, wind turbine 10 includes one or more sensors 50 positioned to measure loads, accelerations, and/or displacements that pertain to one or more bending moments acting on rotor shaft 30, which are caused by imbalanced loads acting on rotor 18. Sensor(s) 50 may measure loads, accelerations, and/or displacements within any component of wind turbine 10, including rotating components and/or non-rotating components (sometimes referred to as fixed-frame components) of wind turbine 10. For example, sensor(s) 50 may measure loads, accelerations, and/or displacements within, but not limited to, a housing 51 of main bearing 31, one or more blades 24, and/or rotor shaft 30. As described in more detail below, when measuring loads, accelerations, and/or displacements within non-rotating components of wind turbine 10, a position of rotor 14 is also measured. Each sensor(s) 50 may be any suitable sensor, such as, but not limited to, strain gages, optical sensors, acoustic sensors, magnetic eddy current sensors, and/or capacitive and/or inductive field sensors. Wind turbine 10 may include any number of sensor(s) 50 positioned in any arrangement, configuration, orientation, and/or location. In some embodiments, sensor(s) 50 are located and orientated to measure loads, accelerations, and/or displacements within main bearing housing 51, one or more rotor blades 24, and/or rotor shaft 30. For example, in some embodiments, a plurality of sensors 50 are positioned to measure a deflection of rotor shaft 30 and/or main bearing 31.

Wind turbine 10 may also include one or more other sensors (not shown) coupled to one or more components of wind turbine 10 and/or the electrical load, whether such component(s) are described or illustrated herein, for measuring parameters of such component(s). Such other sensor(s) may include, but are not limited to, sensors configured to measure displacements, yaw, pitch, moments, strain, stress, twist, damage, failure, rotor torque, rotor speed, an anomaly in the electrical load, and/or an anomaly of power supplied to any component of wind turbine 10. Such other sensors may couple to any component of wind turbine 10 and/or the electrical load at any location thereof for measuring any parameter thereof, whether such component, location, and/or parameter is described and/or illustrated herein.

Wind turbine 10 includes a variable blade pitch system 56 for controlling, including but not limited to changing, a pitch angle of rotor blades 24 with respect to a wind direction. Pitch system 56 may be coupled to control system(s) 40 for control thereby. Pitch system 56 includes one or more actuators (not shown) coupled to hub 22 and blades 24 for changing the pitch angle of blades 24 by rotating blades 24 with respect to hub 22. The pitch actuators may include any suitable structure, configuration, arrangement, means, and/or components, whether described and/or illustrated herein, such as, but not limited to, electrical motors, hydraulic cylinders, springs, and/or servomechanisms. Moreover, the pitch actuators may be driven by any suitable means, whether described and/or illustrated herein, such as, but not limited to, hydraulic fluid, electrical power, electro-chemical power, and/or mechanical power, such as, but not limited to, spring force. For example, in some embodiments, the pitch actuators include a pitch drive gear (not shown) that is coupled to a pitch ring gear (not shown). The pitch ring gear is coupled to blade 24 such that rotation of the pitch drive gear rotates blade 24 about an axis of rotation (not shown) to thereby change the pitch of blade 24.

In some embodiments, the pitch actuators may be driven by energy extracted from rotational inertia of rotor 18 and/or a stored energy source (not shown) that supplies components of wind turbine 10, such as, but not limited to, control system(s) 40 and/or pitch system 56, energy during an anomaly in the electrical load and/or power source coupled to wind turbine 10. For example, an anomaly in the electrical load and/or power source may include, but is not limited to, a power failure, an undervoltage condition, an overvoltage condition, and/or an out-of-frequency condition. As such, the stored energy source enables pitching of blades 24 during the anomaly. Although other stored energy sources may be used, in some embodiments the stored energy source includes hydraulic accumulators, electrical generators, stored spring energy, capacitors, and/or batteries. The stored energy sources may be located anywhere within, on, adjacent to, and/or remote from wind turbine 10. In some embodiments, the stored energy source stores energy extracted from rotational inertia of rotor 18, energy stored within a frequency converter (not shown), and/or other auxiliary energy sources such as, but not limited to, an auxiliary wind turbine (not shown) coupled to wind turbine 10, solar panels, and/or hydro-power installations.

Referring again to FIG. 3, in some embodiments, control system(s) 40 include a bus 62 or other communications device to communicate information. One or more processor(s) 64 are coupled to bus 62 to process information, including information from anemometry 46, sensors 48 and/or 50, and/or other sensor(s). Control system(s) 40 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or also storage device(s) 68, if included) can also be used to store temporary variables or other intermediate information during execution of instructions by processor(s) 64. Control system(s) 40 may also include one or more read only memories (ROM) 70 and/or other static storage devices coupled to bus 62 to store and provide static (i.e., non-changing) information and instructions to processor(s) 64. Input/output device(s) 72 may include any device known in the art to provide input data to control system(s) 40 and/or to provide outputs, such as, but not limited to, yaw control and/or pitch control outputs. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein. Control system(s) 40 may also include a sensor interface 74 that allows control system(s) 40 to communicate with anemometry 46, sensors 48 and/or 50, and/or other sensor(s). Sensor interface 74 can be or can include, for example, one or more analog-to-digital converters that convert analog signals into digital signals that can be used by processor(s) 64.

Figure 4:
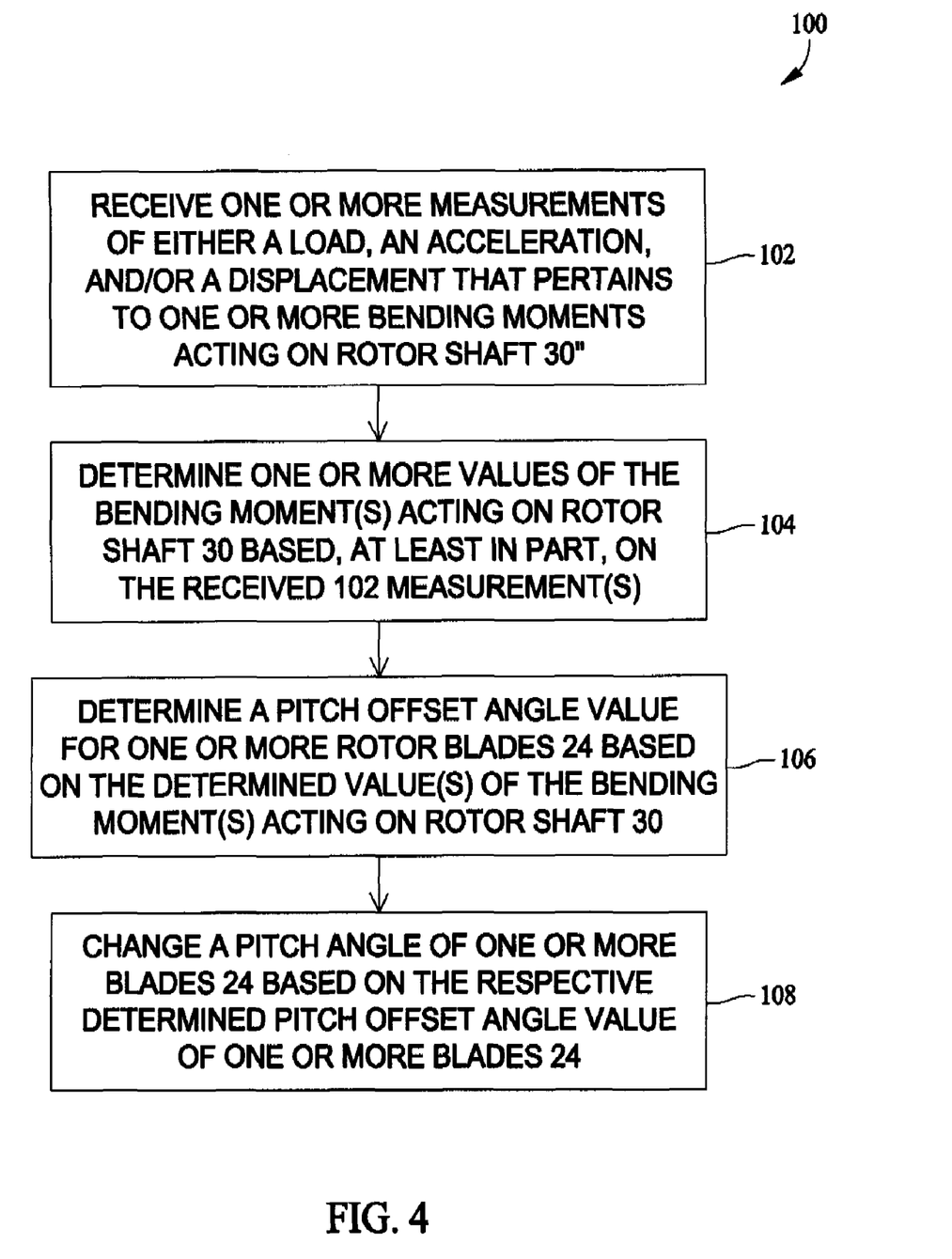
FIG. 4 is a flowchart illustrating an exemplary embodiment of a method for balancing a rotor, such as, but not limited to, a rotor of the wind turbine shown in FIGS. 1-3.

FIG. 4 is a flowchart illustrating an exemplary embodiment of a method 100 for balancing a rotor, such as, but not limited to, rotor 18 (shown in FIGS. 1-3). Although method 100 may be used to balance any rotor, method 100 will be described and illustrated herein with respect to balancing rotor 18 of wind turbine 10 (shown in FIGS. 1-3). Method 100 includes receiving 102, for example at control system 40 (shown in FIGS. 2 and 3), one or more measurements, for example from sensor(s) 50 (shown in FIGS. 2 and 3), of one or more loads, accelerations, and/or displacements that pertain to one or more bending moments acting on rotor shaft 30. The loads, accelerations, and/or displacements measured may be within any component of wind turbine 10, whether rotating or non-rotating. For example, in some embodiments, method 100 includes receiving one or more measurements from sensor(s) 50 of one or more loads, accelerations, and/or displacements within one or more rotor blades 24, rotor shaft 30, and/or main bearing housing 51 (shown in FIG. 2). When measuring loads, accelerations, and/or displacements within non-rotating components of wind turbine 10, in some embodiments, an azimuthal position of rotor 14 is also measured to resolve loading into the rotating frame. The azimuthal position of rotor 14 may be measured using any suitable method, process, structure, and/or means, such as, but not limited to, using an encoder and/or using a proximity sensor to provide a pulse at the azimuth zero and calculating the azimuth based on a speed of generator 24 (shown in FIGS. 2 and 3).

Based, at least in part, on the received measurement(s), one or more values of the bending moment(s) acting on rotor shaft 30 can be determined 104, for example using processor 64 (shown in FIG. 3). In some embodiments, a mean value of one or more bending moments acting on rotor shaft 30 over a predetermined amount of time is determined. Moreover, in some embodiments, when the received measurement(s) are from non-rotating components of wind turbine 10, one or more values of the bending moment(s) acting on rotor shaft 30 are determined based, at least in part, on the received measurement(s) and an azimuthal position of rotor 18 at the time of the measurement(s). A pitch offset angle value for one or more of rotor blades 24 (shown in FIGS. 1-3) can then be determined 106, for example using processor 64, and for example based on the determined value(s) of the bending moment(s) acting on rotor shaft 30. The determined pitch offset angle value(s) facilitate reducing the bending moment(s) acting on rotor shaft 30. For example, the determined pitch offset angle value(s) may facilitate changing the bending moment(s) acting on rotor shaft 30 to about zero, such that rotor 18 is balanced. As such, a pitch angle of one or more of rotor blades 24 can be changed 108, for example using processor 64 and/or pitch system 56 (shown in FIG. 2), based on the respective determined pitch offset angle value of one or more blades 24 to facilitate reducing the bending moment(s) acting on rotor shaft 30. For example, a pitch angle of one or more of rotor blades 24 can be changed to facilitate changing the bending moment(s) acting on rotor shaft 30 to about zero. In some embodiments, the determined pitch offset angle value(s) facilitate changing a mean value of one or more bending moments acting on rotor shaft 30 over a predetermined amount of time to about zero. In some embodiments, an iterative process may be used to achieve balance of rotor 18, wherein the received measurement(s) are averaged after each pitch change to move the balance to about zero.

In some embodiments, wherein wind turbine 10 includes a plurality of sensors 50 each sending one or more measurements, the measurement(s) received from one of sensors 50 may be filtered out to, for example, facilitate reducing an effect of a variation in a surface of rotor shaft 30 on the determined value(s) of the bending moment(s) acting on rotor shaft 30. Such filtering may also remove unnecessary signal frequencies and/or components. For example, such filtering may be configured to eliminate signal response to bending moment variation as a blade 24 passes tower 14. In some embodiments, the bending moment value(s) acting on rotor shaft 30 is determined solely based on the received measurements of load(s) induced into the housing of bearing 31. However, in some embodiments (whether wind turbine 10 includes a plurality of sensors 50 each sending one or more measurements), a surface of rotor shaft 30 is mapped, for example using processor 64, as a function of azimuth at one or more predetermined wind speeds and/or one or more predetermined rotational speeds of rotor shaft 30. As such, filtering the measurement(s) received from one of sensors 50 may not be utilized to facilitate reducing an effect of a variation in the surface of rotor shaft 30 on the determined value(s) of the bending moment(s) acting on rotor shaft 30 when the rotor shaft surface has been mapped as described herein. Rather, in embodiments wherein the surface of rotor shaft 30 is mapped as described herein, the bending moment value(s) acting on rotor shaft 30 may be determined based on the received measurements and an azimuthal position of rotor 18 at the time of the measurement(s), wherein a comparison of the surface map of rotor shaft 30 with the azimuthal position allows compensation for variations in the rotor shaft surface.

The herein-described and/or illustrated embodiments are cost-effective and efficient for balancing a rotor of a rotary machine. For example, the embodiments described and/or illustrated include determining one or more values of one or more bending moments acting on a rotor shaft based, at least in part, on loads, accelerations, and/or displacements within components of the rotary machine. Based on the determined bending moment value(s), a pitch angle offset value for one or more rotor blades that facilitates decreasing the bending moment(s) acting on the rotor shaft can be determined. The pitch angle of one or more rotor blades can then be offset by the offset value to facilitate reducing the bending moment(s) acting on the rotor shaft, and thereby facilitate balancing the rotor. As such, the embodiments described and/or illustrated herein may facilitate reducing imbalanced loads acting on the rotor and may thereby facilitate reducing damage to and/or failure of components of the rotary machine. For example, the embodiments described and/or illustrated herein may facilitate reducing fatigue damage to a bedplate that connects a tower of a wind turbine to the ground, may facilitate reducing damage to and/or failure of portions of a nacelle of a wind turbine, and/or may facilitate reducing damage to and/or failure of other components of a wind turbine, such as, but not limited to, a rotor shaft, rotor blades, main shaft bearings, a yaw system of the wind turbine, and/or the wind turbine tower.

Although the embodiments described and/or illustrated herein are described and/or illustrated with respect to a wind turbine, and more specifically balancing a rotor of a wind turbine, practice of the embodiments described and/or illustrated herein is not limited to wind turbines. Rather, the embodiments described and/or illustrated herein are applicable to balancing any rotor having one or more blades operating in a surrounding fluid.

Exemplary embodiments are described and/or illustrated herein in detail. The embodiments are not limited to the specific embodiments described herein, but rather, components and steps of each embodiment may be utilized independently and separately from other components and steps described herein. Each component, and each step, can also be used in combination with other components and/or method steps.

When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A method for balancing a rotor of a rotary machine, wherein the rotor includes at least two rotor blades and a rotor shaft, said method comprising:
   receiving a measurement of at least one of a load, an acceleration, and a displacement that pertains to at least one imbalanced load acting on the rotor shaft; and
   determining a pitch offset angle value of at least one rotor blade that facilitates reducing the at least one imbalanced load acting on the rotor shaft, wherein the at least one load imbalance is caused by at least one of a mass imbalance in the at least two rotor blades, a geometrical irregularity in the rotor, a difference in aerodynamic geometry between the at least two rotor blades, and a difference in a pitch angle zero point between the at least two rotor blades.

2. A method in accordance with claim 1 wherein receiving a measurement of at least one of a load, an acceleration, and a displacement that pertains to at least one imbalanced load acting on the rotor shaft comprises receiving a measurement of a load, an acceleration, or a displacement within at least one of a non-rotating component of the rotary machine, the rotor shaft, at least one rotor blade, and a housing of a bearing coupled to the rotor shaft.

3. A method in accordance with claim 1 wherein determining a pitch offset angle value of at least one rotor blade that facilitates reducing the at least one imbalanced load acting on the rotor shaft comprises determining a pitch offset angle value based, at least in part, on the received measurement.

4. A method in accordance with claim 3 wherein determining a pitch offset angle value based, at least in part, on the received measurement comprises filtering out one of a plurality of received measurements.

5. A method in accordance with claim 4 wherein filtering out one of the plurality of received measurements comprises reducing an effect of a variation in a surface of the rotor shaft on the at least one imbalanced load acting on the rotor shaft.

6. A method in accordance with claim 1 wherein determining a pitch offset angle value for at least one rotor blade comprises determining a pitch offset angle value for each of the at least two rotor blades.

7. A method in accordance with claim 1 further comprising changing a pitch angle of at least one rotor blade based on the determined pitch offset angle value of at least one rotor blade to facilitate reducing the at least one imbalanced load acting on the rotor shaft.

8. A method in accordance with claim 1 wherein determining a pitch offset angle of at least one rotor blade that facilitates reducing the at least one imbalanced load comprises determining a pitch offset angle of at least one rotor blade that facilitates reducing at least one bending moment acting on the rotor shaft that is caused by the at least one imbalanced load.

9. A method in accordance with claim 8 wherein determining the pitch offset angle that facilitates reducing at least one bending moment acting on the rotor shaft comprises determining at least one bending moment value based, at least in part, on the received measurement, the surface map of the rotor shaft, and an azimuthal position of the rotor shaft at a time the received measurement was taken.

10. A method in accordance with claim 9 wherein determining at least one value of the at least one bending moment acting on the rotor shaft based, at least in part, on the received measurement comprises determining a mean value of at least one bending moment acting on the rotor shaft over a predetermined amount of time.

11. A method in accordance with claim 10 wherein determining a pitch offset angle value of at least one rotor blade comprises determining a pitch offset angle value that facilitates changing a mean value of the at least one bending moment acting on the rotor shaft to about zero based on the determined mean value of the at least one bending moment acting on the rotor shaft.

12. A rotary machine comprising:
a rotor comprising a hub, at least two rotor blades coupled to said hub, and a rotor shaft coupled to said hub for rotation therewith;
at least one blade pitch actuator coupled to said at least two rotor blades for controlling an angle of pitch of said at least two rotor blades;
at least one sensor configured to measure at least one of a load, an acceleration, and a displacement that pertains to at least one imbalanced load acting on said rotor shaft, wherein the at least one imbalanced load is caused by at least one of a mass imbalance in the at least two rotor blades, a geometrical irregularity in the rotor, a difference in aerodynamic geometry between the at least two rotor blades, and a difference in a pitch angle zero point between the at least two rotor blades; and
a processor coupled to said at least one blade pitch actuator and coupled to said at least one sensor, said processor configured to balance said rotor by:
receiving, from said at least one sensor, at least one measurement of a load, an acceleration, or a displacement that pertains to at least one imbalanced load acting on said rotor shaft; and
determining a pitch offset angle value for at least one rotor blade that facilitates reducing the at least one imbalanced load acting on said rotor shaft.

13. A rotary machine in accordance with claim 12 wherein said processor is configured to receive, from said at least one sensor, at least one measurement of either a load, an acceleration, or a displacement within at least one of said rotor shaft, at least one rotor blade, a housing of a bearing coupled to said rotor shaft, and a non-rotating component of the rotary machine.

14. A rotary machine in accordance with claim 12 wherein said processor is configured to receive a plurality of measurements of either a load, an acceleration, or a displacement that pertains to at least one bending moment acting on said rotor shaft caused by the at least one imbalanced load acting on said rotor shaft.

15. A rotary machine in accordance with claim 14 wherein said processor is configured to:
determine at least one value corresponding to at least one bending moment acting on the rotor shaft caused by the at least one imbalanced load; and
determine a pitch offset angle value for at least one rotor blade that facilitates reducing the at least one imbalanced load acting on said rotor shaft.

16. A rotary machine in accordance with claim 15 wherein said processor is configured to determine the at least one bending moment value based, at least in part, on the received at least one measurement and an azimuthal position of the rotor shaft at a time the received at least one measurement was taken.

17. A rotary machine in accordance with claim 15 wherein said processor is configured to determine a mean value of at least one bending moment acting on said rotor shaft over a predetermined amount of time.

18. A rotary machine in accordance with claim 17 wherein said processor is configured to determine a pitch offset angle value that facilitates reducing the at least one imbalanced load acting on said rotor shaft based on the determined mean value of the at least one bending moment acting on said rotor shaft.

19. A rotary machine in accordance with claim 12 wherein said processor is configured to map a surface of said rotor shaft as a function of azimuth at least one of at least one predetermined wind speed and at least one predetermined rotational speed of said rotor shaft.

20. A rotary machine in accordance with claim 12 wherein said processor is configured to determine a pitch offset angle value for each of said at least two rotor blades.

* * * * *